US012621086B2

(12) United States Patent
Prasad et al.

(10) Patent No.: US 12,621,086 B2
(45) Date of Patent: May 5, 2026

(54) CONFIGURATION AND INTERPRETATION OF CONTROL INFORMATION FOR RETRANSMISSION

(71) Applicant: Nokia Technologies Oy, Espoo (FI)

(72) Inventors: Athul Prasad, Naperville, IL (US); David Bhatoolaul, Swindon (GB); Naizheng Zheng, Beijing (CN); David Navrátil, Espoo (FI); Volker Pauli, Munich (DE); Ugur Baran Elmali, Munich (DE)

(73) Assignee: Nokia Technologies Oy, Espoo (FI)

( * ) Notice: Subject to any disclaimer, the term of this patent is extended or adjusted under 35 U.S.C. 154(b) by 36 days.

(21) Appl. No.: 18/681,364

(22) PCT Filed: Aug. 6, 2021

(86) PCT No.: PCT/CN2021/111362
§ 371 (c)(1),
(2) Date: Feb. 5, 2024

(87) PCT Pub. No.: WO2023/010585
PCT Pub. Date: Feb. 9, 2023

(65) Prior Publication Data
US 2024/0348375 A1      Oct. 17, 2024

(51) Int. Cl.
*H04L 1/1822* (2023.01)
*H04L 1/1829* (2023.01)

(52) U.S. Cl.
CPC .......... *H04L 1/1822* (2013.01); *H04L 1/1864* (2013.01)

(58) Field of Classification Search
CPC ........................... H04L 1/1822; H04L 1/1864
See application file for complete search history.

(56) References Cited

U.S. PATENT DOCUMENTS

| 10,893,506 B2 | 1/2021 | Islam et al. |
| 2010/0278066 A1* | 11/2010 | Hole ................. H04W 36/0061 |
| | | 370/252 |

(Continued)

FOREIGN PATENT DOCUMENTS

| CN | 111083735 A | 4/2020 |
| WO | 2017/045180 A1 | 3/2017 |

(Continued)

OTHER PUBLICATIONS

Machine translation of WO-2020235452-A1 (Year: 2020).*

(Continued)

*Primary Examiner* — Jean B Corrielus
(74) *Attorney, Agent, or Firm* — Barta Jones, PLLC

(57) ABSTRACT

Example embodiments of the present disclosure relate to configuration and interpretation of control information for a retransmission. A first device receives control information from a second device. In accordance with a determination that the control information indicates a retransmission to be scheduled from the second device. the first device determines an information combination of at least one of the following: at least one field of the control information, a search space in which the control information is received. and a format of the control information. The first device further determines a source traffic type of the retransmission based on the information combination, the source traffic type of the retransmission indicating whether the retransmission is for traffic in a point-to-multipoint initial transmission or in a point-to-point initial transmission.

18 Claims, 7 Drawing Sheets

600

610
RECEIVE CONTROL INFORMATION FROM A SECOND DEVICE

620
DETERMINE AN INFORMATION COMBINATION OF AT LEAST ONE OF THE FOLLOWING: AT LEAST ONE FIELD OF THE CONTROL INFORMATION, A SEARCH SPACE IN WHICH THE CONTROL INFORMATION IS DECODED, AND A FORMAT OF THE CONTROL INFORMATION

630
DETERMINE A SOURCE TRAFFIC TYPE OF THE RETRANSMISSION BASED ON THE INFORMATION COMBINATION

(56)　　　　　　References Cited

U.S. PATENT DOCUMENTS

| | | | |
|---|---|---|---|
| 2018/0139730 A1 | 5/2018 | Wang et al. | |
| 2019/0182860 A1 | 6/2019 | Lyu et al. | |
| 2020/0022144 A1 | 1/2020 | Papasakellariou | |
| 2021/0099254 A1 | 4/2021 | Babaei et al. | |
| 2021/0160879 A1 | 5/2021 | Lin et al. | |
| 2021/0194714 A1 | 6/2021 | Kadiri et al. | |
| 2023/0147173 A1* | 5/2023 | Matsumura | H04W 72/1273 370/329 |
| 2024/0032142 A1* | 1/2024 | Liu | H04L 5/0053 |
| 2024/0188186 A1* | 6/2024 | Dai | H04W 4/06 |

FOREIGN PATENT DOCUMENTS

| | | | | |
|---|---|---|---|---|
| WO | WO-2018063326 A1 * | 4/2018 | | H04W 4/70 |
| WO | 2021/126924 A1 | 6/2021 | | |

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.6.0, Jun. 2021, pp. 1-152.

"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.

"3rd Generation Partnership Project; Technical Specification Group Radio Access Network; NR; Medium Access Control (MAC) protocol specification (Release 16)", 3GPP TS 38.321, V16.5.0, Jun. 2021, pp. 1-157.

"3rd Generation Partnership Project; Technical Specification Group Radio Access Network; NR; Multiplexing and channel coding (Release 16)", 3GPP TS 38.212, V16.6.0, Jun. 2021, pp. 1-153.

"3rd Generation Partnership Project; Technical Specification Group Radio Access Network; NR; Physical layer procedures for control (Release 16)", 3GPP TS 38.213, V16.6.0, Jun. 2021, pp. 1-187.

"WID revision: NR Multicast and Broadcast Services", 3GPP TSG RAN Meeting #88-e, RP-201038, Agenda: 9.10.8, Huawei, Jun. 29-Jul. 3, 2020, 6 pages.

Alepuz et al., "LTE-Advanced Pro Broadcast Radio Access Network Benchmark", 5G-Xcast, Broadcast and Multicast Communication Enablers for the Fifth-Generation of Wireless Systems, Deliverable D3.1, Version 1.1, Jun. 29, 2018, 140 pages.

"Summary#1 on mechanisms to support group scheduling for RRC_CONNECTED UEs for NR MBS", 3GPP TSG RAN WG1 #105-e, R1-2105973, Agenda: 8.12.1, CMCC, May 10-27, 2021, pp. 1-71.

"4G/LTE—DCI", ShareTechnote, Retrieved on May 7, 2024, Webpage available at : https://en.wikipedia.org/wiki/IEEE_802.11.

"Mechanisms to support group scheduling for RRC_CONNECTED UEs for NR MBS", 3GPP TSG RAN WG1 #104b-e, R1-21XXXX, Agenda: 8.12.1, CMCC, Apr. 12-20, 2021, pp. 1-63.

"IEEE 802.11", Wikipedia, Retrieved on May 7, 2024, Webpage available at : https://en.wikipedia.org/wiki/IEEE_802.11.

International Search Report and Written Opinion received for corresponding Patent Cooperation Treaty Application No. PCT/CN2021/111362, dated Apr. 26, 2022, 9 pages.

"HARQ operation to improve reliability for PTM transmission", 3GPP TSG-RAN WG2 Meeting #113 electronic, R2-2100172, Agenda: 8.1.2.1, MediaTek Inc, Jan. 25-Feb. 5, 2021, pp. 1-4.

"Group scheduling for NR Multicast and Broadcast Services", 3GPP TSG RAN WG1 #104-e, R1-2100144, Agenda: 8.1.2.1, OPPO, Jan. 25-Feb. 5, 2021, 6 pages.

"Discussion on group scheduling mechanisms", 3GPP TSG RAN WG1 #103-e, R1-2008034, Agenda: 8.1.2.1, CMCC, Oct. 26-Nov. 13, 2020, 14 pages.

* cited by examiner

200

600

610

RECEIVE CONTROL INFORMATION FROM A SECOND DEVICE

620

DETERMINE AN INFORMATION COMBINATION OF AT LEAST ONE OF THE FOLLOWING: AT LEAST ONE FIELD OF THE CONTROL INFORMATION, A SEARCH SPACE IN WHICH THE CONTROL INFORMATION IS DECODED, AND A FORMAT OF THE CONTROL INFORMATION

630

DETERMINE A SOURCE TRAFFIC TYPE OF THE RETRANSMISSION BASED ON THE INFORMATION COMBINATION

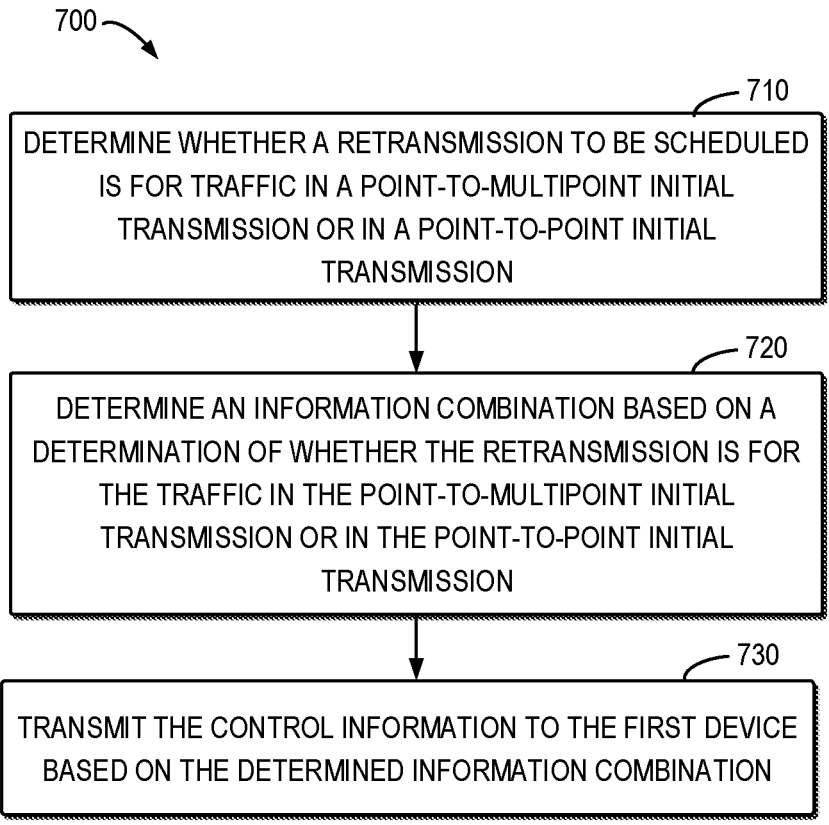

700

710

DETERMINE WHETHER A RETRANSMISSION TO BE SCHEDULED IS FOR TRAFFIC IN A POINT-TO-MULTIPOINT INITIAL TRANSMISSION OR IN A POINT-TO-POINT INITIAL TRANSMISSION

720

DETERMINE AN INFORMATION COMBINATION BASED ON A DETERMINATION OF WHETHER THE RETRANSMISSION IS FOR THE TRAFFIC IN THE POINT-TO-MULTIPOINT INITIAL TRANSMISSION OR IN THE POINT-TO-POINT INITIAL TRANSMISSION

730

TRANSMIT THE CONTROL INFORMATION TO THE FIRST DEVICE BASED ON THE DETERMINED INFORMATION COMBINATION

CONFIGURATION AND INTERPRETATION OF CONTROL INFORMATION FOR RETRANSMISSION

RELATED APPLICATION

This application is a 371 of PCT Application No. PCT/CN2021/111362, filed on Aug. 6, 2021, of which is incorporated herein by reference in its entirety.

FIELD

Embodiments of the present disclosure generally relate to the field of telecommunication and in particular, to devices, methods, apparatuses and computer readable storage medium for configuration and interpretation of control information for a retransmission.

BACKGROUND

With the rapid development of the communication technology, communication systems can support various types of service applications for devices. For example, as part of the work on the fifth-generation (5G) (also called new radio (NR)) multicast, the Third Generation Partnership Project (3GPP) is currently defining mechanisms for enabling delivery of multicast or broadcast traffic to a multitude of terminal devices. One of the aims of the work is to define group scheduling mechanisms that enable the multicast or broadcast traffic to be scheduled using the common data channel resources, while maintaining maximum commonalities with the currently defined unicast scheduling and operation mechanisms. As a result, the communication systems can support both the unicast scheduling and multicast/broadcast scheduling.

SUMMARY

In general, example embodiments of the present disclosure provide a solution for configuration and interpretation of control information for a retransmission of a PTM transmission. Embodiments that do not fall under the scope of the claims, if any, are to be interpreted as examples useful for understanding various embodiments of the disclosure.

In a first aspect, there is provided a first device. The first device comprises at least one processor; and at least one memory including computer program code; where the at least one memory and the computer program code are configured to, with the at least one processor, cause the first device to: receive control information from a second device; in accordance with a determination that the control information indicates a retransmission to be scheduled from the second device, determine an information combination of at least one of the following: at least one field of the control information, a search space in which the control information is received, and a format of the control information; and determine a source traffic type of the retransmission based on the information combination, the source traffic type of the retransmission indicating whether the retransmission is for traffic in a point-to-multipoint initial transmission or in a point-to-point initial transmission.

In a second aspect, there is provided a second device. The second device comprises at least one processor; and at least one memory including computer program code; where the at least one memory and the computer program code are configured to, with the at least one processor, cause the second device to: determine whether a retransmission to be scheduled is for traffic in a point-to-multipoint initial transmission or in a point-to-point initial transmission; determine, based on a determination of whether the retransmission is for the traffic in the point-to-multipoint initial transmission or in the point-to-point initial transmission, an information combination of at least one of the following: at least one field of control information for the retransmission, a search space for the control information, and a format of the control information; and transmit the control information to the first device based on the determined information combination, the control information indicating that the retransmission is scheduled.

In a third aspect, there is provided a method. The method comprises receiving, at a first device, control information from a second device; in accordance with a determination that the control information indicates a retransmission to be scheduled from the second device, determining an information combination of at least one of the following: at least one field of the control information, a search space in which the control information is received, and a format of the control information; and determining a source traffic type of the retransmission based on the information combination, the source traffic type of the retransmission indicating whether the retransmission is for traffic in a point-to-multipoint initial transmission or in a point-to-point initial transmission.

In a fourth aspect, there is provided a method. The method comprises determining, at a second device, whether a retransmission to be scheduled is for traffic in a point-to-multipoint initial transmission or in a point-to-point initial transmission; determining, based on a determination of whether the retransmission is for the traffic in the point-to-multipoint initial transmission or in the point-to-point initial transmission, an information combination of at least one of the following: at least one field of control information for the retransmission, a search space for the control information, and a format of the control information; and transmitting the control information to the first device based on the determined information combination, the control information indicating that the retransmission is scheduled.

In a fifth aspect, there is provided a first apparatus. The first apparatus comprises means for receiving control information from a second apparatus; means for, in accordance with a determination that the control information indicates a retransmission to be scheduled from the second apparatus, determining an information combination of at least one of the following: at least one field of the control information, a search space in which the control information is received, and a format of the control information; and means for determining a source traffic type of the retransmission based on the information combination, the source traffic type of the retransmission indicating whether the retransmission is for traffic in a point-to-multipoint initial transmission or in a point-to-point initial transmission.

In a sixth aspect, there is provided a second apparatus. The second apparatus comprises means for determining whether a retransmission to be scheduled is for traffic in a point-to-multipoint initial transmission or in a point-to-point initial transmission; means for determining, based on a determination of whether the retransmission is for the traffic in the point-to-multipoint initial transmission or in the point-to-point initial transmission, an information combination of at least one of the following: at least one field of control information for the retransmission, a search space for the control information, and a format of the control information; and means for transmitting the control information to the first apparatus based on the determined information combination, the control information indicating that the retransmission is scheduled.

In a seventh aspect, there is provided a computer readable medium. The computer readable medium comprises program instructions for causing an apparatus to perform at least the method according to the third aspect.

In an eighth aspect, there is provided a computer readable medium. The computer readable medium comprises program instructions for causing an apparatus to perform at least the method according to the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 7 illustrates a flowchart of an example process implemented at a second device in accordance with some example embodiments of the present disclosure;

Throughout the drawings, the same or similar reference numerals represent the same or similar element.

DETAILED DESCRIPTION

Figure 1:
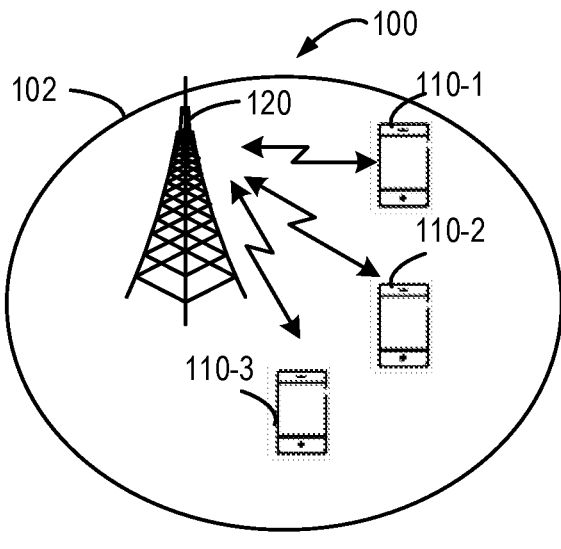
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs. References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), New Radio Advanced (NR-A), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some example embodiments of the present disclosure. It is noted that example embodiments of the present disclosure are equally applicable to other resources in other domains.

FIG. 1 shows an example communication environment 100 in which example embodiments of the present disclosure can be implemented. In the communication environment 100, a plurality of communication devices, including first devices 110-1, 110-2, and 110-3, and a second device 120 can communicate with each other.

For the purpose of discussion, the first devices 110-1, 110-2, 110-3 are collectively or individually referred to as first devices 110. In the example of FIG. 1, the first devices 110 are illustrated as terminal devices while the second device 120 is illustrated as a network device serving the terminal device. The serving area of the second device 120 may be called a cell 102.

It is to be understood that the number of devices and their connections shown in FIG. 1 are only for the purpose of illustration without suggesting any limitation. The environment 100 may include any suitable number of devices adapted for implementing embodiments of the present disclosure. Although not shown, it would be appreciated that one or more additional devices may be located in the cell 102, and one or more additional cells may be deployed in the communication environment 100. It is noted that although illustrated as a network device, the second device 120 may be other device than a network device. Although illustrated as a terminal device, the first device 110 may be other device than a terminal device.

In some example embodiments, if the first device 110 is a terminal device and the second device 120 is a network device, a link from the second device 120 to the first device 110 is referred to as a downlink (DL), while a link from the first device 110 to the second device 120 is referred to as an uplink (UL). In DL, the second device 120 is a transmitting (TX) device (or a transmitter) and the first device 110 is a receiving (RX) device (or a receiver). In UL, the first device 110 is a TX device (or a transmitter) and the second device 120 is a RX device (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

During operation, scheduling information for UL data (or a physical uplink shared channel (PUSCH)) or DL data (or a physical downlink shared channel (PDSCH)) is delivered from a network device to a terminal device through downlink control information (DCI). The DCI may pass through a channel coding and modulation process and may then be transmitted through a physical downlink control channel (PDCCH). A cyclic redundancy check (CRC) is attached to a payload of a DCI message, and the CRC is scrambled by a radio network temporary identifier (RNTI) corresponding to identity of the terminal device. Upon receiving the DCI transmitted on the PDCCH, the terminal device may check the CRC by using the allocated RNTI. If the check result of the CRC is correct, it can be seen that the corresponding DCI is transmitted to the terminal device. By receiving the DCI, the terminal device may be able to obtain the scheduling information for UL data or DL data to be communicated.

A multicast/broadcast service (MBS) can be supported in the communication environment 100 through group scheduling mechanisms. According to the MBS, point-to-multipoint (PTM) transmission may be used to effectively transmit data in single cell scenarios. In PTM communications, data is transmitted from a single point (e.g., a network device) to a number of terminal devices via a common channel (e.g., a physical downlink shared channel (PDSCH)). In addition to the PTM communications, a unicast service can also be supported in the communication environment 100, which rely on point-to-point (PTP) communications where a single point transmits data to another single point. PTM communications may provide great benefits than PTP communications, for example, when cell synchronization is difficult due to area or operator configurations.

In conventional communication systems, e.g., the 4G communication systems, the group scheduling mechanisms were enabled using semi-static or dynamic broadcast signalling of control information which pointed to semi-static or dynamic shared data channel resources, e.g., for evolved multicast broadcast multimedia service (eMBMS) and single-cell point-to-multipoint (SC-PTM). For eMBMS and SC-PTM, due to the support for receive-only mode terminal devices, there were a lot of limitations imposed on the system design, such as the support for devices that are not registered with the network device, support for idle mode devices, etc., which had significant impact in terms of how the multicast data/traffic channel (MTCH) and multicast control channel (MCCH) information was sent using the physical channel-using PDSCH or physical multicast channel (PMCH). In addition, there are various physical layer scheduling concepts such as bandwidth parts did not exist for some conventional communication systems, as well as logical channels such as SC-MCCH/MTCH are not defined for 5G/NR-for connected mode, which makes it impossible to redefine LTE-based multicast-broadcast features for the new generation of communication system.

Figure 2:
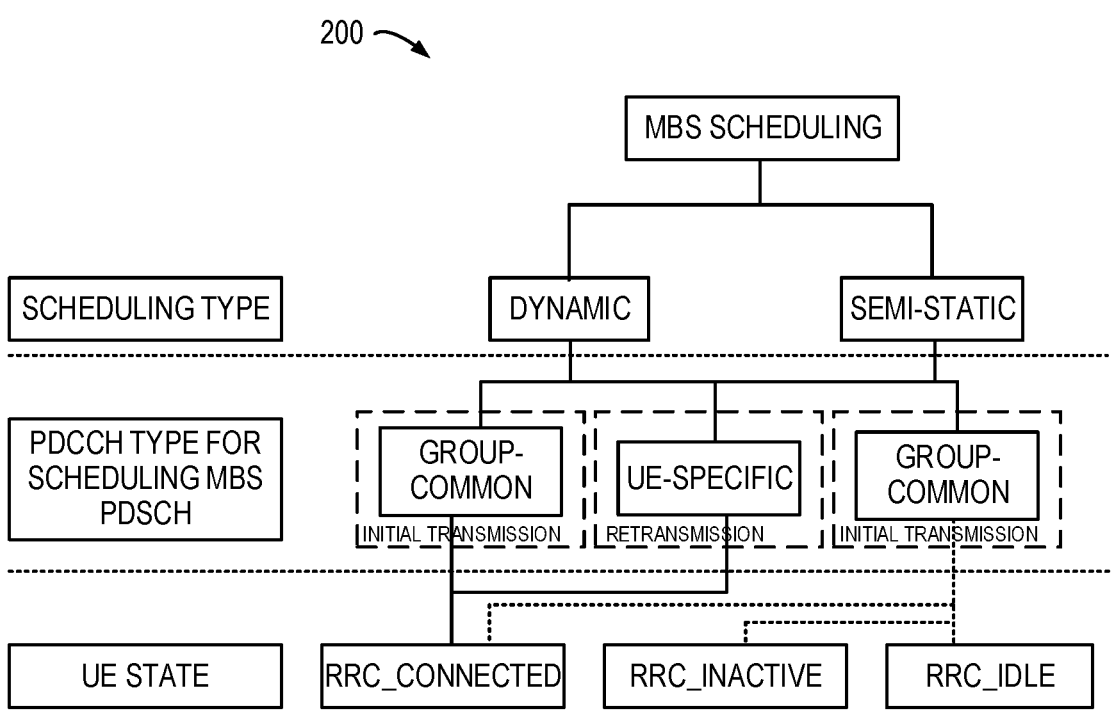
FIG. 2 illustrates a summary of various possible scheduling types for initiation transmission and retransmission.

FIG. 2 illustrates a summary 200 of various possible scheduling types for initiation transmission and retransmission according to current discussions and agreements in the communication standardization works. As shown in FIG. 2, it was agreed to support group-common PDCCH-using either dynamic or semi-static/semi-persistent scheduling for group-common PDSCH of multicast traffic. This transmission scheme may be called PTM scheme 1. For group-common PDCCH, the CRC of the DCI would be scrambled using a group-common radio network temporary identifier (G-RNTI). It was also agreed that UE-specific PDCCH would be support for the retransmission of the multicast traffic. Such retransmissions are used to enhance the reliability of the multicast traffic reception as well as to improve the spectral efficiency of the network. The CRC of the UE-specific PDCCH would be scrambled using the UE-specific C-RNTI. It is assumed that the associated PDSCH resources would also be UE-specific. This transmission scheme may be called PTP retransmission for PTM scheme 1.

It has also been agreed that the HARQ (Hybrid Automatic Repeat reQuest) process identifier (ID) utilized for unicast and multicast initial transmissions and re-transmissions can be dynamically assigned by the transmitter. Hence, there are no reserved HARQ process IDs for various traffic types, and it would be up to the transmitter's implementation to decide which HARQ process ID is utilized for the transmission of various transport blocks. A new data indicator (NDI) field in the control information (e.g., DCI) may indicate the information whether the received transmission is an initial one or a retransmission. For PTP traffic, the NDI field in the DCI is toggled between initial transmissions and retransmissions, indicating to the terminal device that the received DCI is for an initial or retransmission. However, since for PTM a multitude of terminal devices receive the DCI where each terminal device might have a different interpretation of the NDI field based on previous PTP transmission or retransmission, it is assumed that the value of the NDI field indicates whether it is a new transmission or retransmission.

Figure 3:
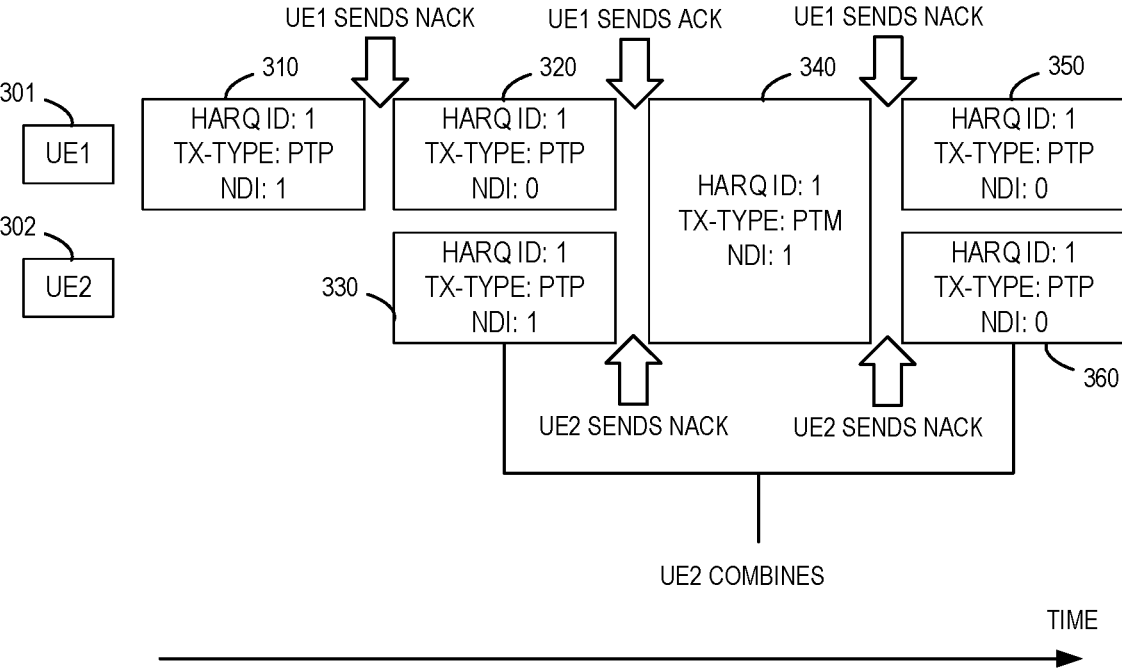
FIG. 3 illustrates an example of scheduling data for multiple UEs.

However, due to the dynamic assignment of HARQ process IDs, there may be a problem for the receiving devices to receive the transmissions. FIG. 3 illustrates an example of scheduling data for multiple UEs. At the beginning, PTP traffic is scheduled by a network device to UE1 301 via a PTP initial transmission 310 with a transmission (TX) type indicating PTP. It is assumed that the network device assigns a HARQ ID of "1" for the PTP initial transmission 310 and the NDI field of DCI transmitted for the PTP initial transmission 310 is set to "1" to indicate that this is an initial transmission containing new data. UE1 301 fails to successfully decode the PTP traffic from the PTP initial transmission 310 and thus transmits HARQ feedback of non-acknowledgement (NACK) to the network device. The network device then performs a PTP retransmission 320 for the PTP initial transmission 310. The network device assigns the same HARQ ID of "1" for the PTP retransmission 320 and the NDI field of DCI transmitted for the PTP initial transmission 320 is set to "0" to indicate that this is a retransmission. UE1 301 receives and successfully decodes the PTP traffic based on the PTP retransmission 320 and probably further based on the PTP initial transmission 310. UE1 310 transmits HARQ acknowledgment (ACK) feedback to the network device.

PTP traffic may also be scheduled by the network device to UE2 302 via a PTP initial transmission 330 with a TX type indicating PTP. The network device assigns a HARQ ID of "1" for the PTP initial transmission 310 and the NDI field of DCI transmitted for the PTP initial transmission 310 is set to "1" to indicate that this is an initial transmission containing new data. UE2 302 fails to successfully decode the PTP initial transmission 330 and transmits HARQ NACK feedback to the network device.

At a time following the PTP initial transmission 330, the network device schedules PTM traffic to both the UE1 301 and UE2 302 via a PTM initial transmission 340. The network device reuses the same HARQ ID of "1" for the earlier PTM initial transmission 340. UE1 301 fails to successfully decode the PTM initial transmission 340 and transmits HARQ NACK feedback to the network device. UE2 302 also misses the PTM initial transmission 340 and transmits HARQ NACK feedback to the network device if a semi-static type-1 codebook is used. In response to the HARQ NACK feedback, the network device sends a PTP retransmission 350 of the PTM initial transmission 340 to UE1 301 and sends a PTP retransmission 360 of the PTM initial transmission 340 to UE2 302. In this scenario, UE2 302, which missed the PTM initial transmission 340, may either try to soft-combine the received PTP retransmission 360 of PTM traffic with the received PTP traffic in the PTP initial transmission 330, or drop the PTP retransmission 360, which would cause the erroneous reception of the transport block (TB) of the traffic sent from the network device. In the first scenario, UE2 302 may send further NACK feedback to the network device, all of which may end with failure to decode the TB.

To solve the above mentioned problem, it has been proposed to introduce a new field in DCI of PTP transmission to differentiate the HARQ process ID used for a PTP (re) transmission for unicast and a PTP retransmission for multicast. That is, the additional field in DCI can be set to indicate to the terminal device whether the DCI is for an initial transmission or a retransmission for a PTP initial transmission or for a PTM transmission.

However, by introducing a new field in the DCI, which would be unknown to legacy terminal devices, and terminal devices that do not support multicast/broadcast reception. There are also issues related to estimation of the DCI size in case the terminal device is receiving both unicast and multicast traffic using the same search space. It would be challenging for the terminal device to engage in blind decoding, since the network device may schedule either DCI for unicast and/or multicast traffic using the same PDCCH resource, with different sizes-depending on whether this new field is used or not. Such variable sizes would possibly require higher layer signalling information the terminal device regarding which DCI format/size would be utilized-with or without the additional field for indicating the type of the source initial transmission. Also, there is added complexity from the network device's perspective, in case there is co-existence of legacy and new-generation terminal devices supporting NR MBS.

According to some example embodiments of the present disclosure, there is provided a solution for configuration and interpretation of control information for a retransmission. In this solution, it is proposed to utilize a specific information combination of at least one field of control information, a search space in which the control information is received, and a format of the control information, to indicate differentiate between a retransmission for a PTM initial transmission and a retransmission for a PTP initial transmission. Through this solution, the indication of a retransmission for PTM traffic can be optimized, without or with limited changes to control information. No new field is introduced, and no impact is imposed on the size of the control information, which makes the estimation of the size of the control information simplified.

Example embodiments of the present disclosure will be described in detail below with reference to the accompanying drawings.

Figure 4:
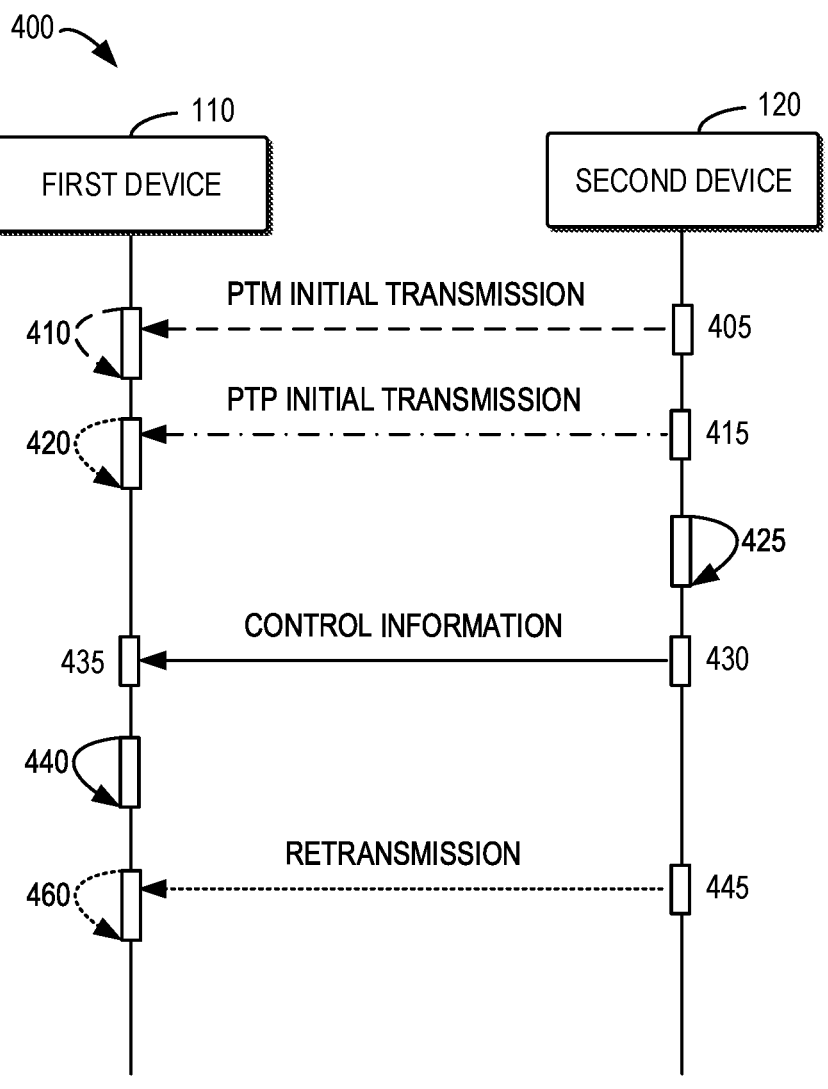
FIG. 4 illustrates a signaling flow for communications in accordance with some example embodiments of the present disclosure.

Reference is now made to FIG. 4. FIG. 4 illustrates a signaling flow 400 for communications in accordance with some example embodiments of the present disclosure. As shown in FIG. 4, the signaling flow 400 involves the first devices 110 and the second device 120 as shown in FIG. 1.

The signaling flow 400 is related to control information for scheduling data in a retransmission from the second device 120 to the first device 110. The first device 110 is configured to participate in PTM communications with one or more other first devices 110 in the communication environment 100. The second device 120 may transmit a PTM initial transmission in a multicast or broadcast way to multiple first devices 110. If a first device 110 fails to successfully receive the PTM initial transmission, the second device 120 may transmit a retransmission for the PTM initial transmission. The retransmission is performed as a PTP transmission to a specific first device 110 in a unicast way.

In the signaling flow 400, it is assumed that the second device 120 has performed one or more initial transmissions to one or more first devices 110. The initial transmissions may include a PTM initial transmission including PTM traffic for a number of first devices 110, and/or a PTP initial transmission including PTP traffic for a specific device 110. As illustrated in FIG. 3, the second device 120 may perform 405 a PTM initial transmission to the first device 110 (and one or more other first devices), and/or perform 415 a PTP initial transmission to the first device 110. The PTM initial transmission and/or the PTP initial transmission may be initiated in respective HARQ processes using respective HARQ process IDs.

The first device 110 may try to detect 410 the PTM initial transmission and/or detect 420 the PTP initial transmission. It is assumed that the first device 110 fails to successfully detect the PTM traffic and/or the PTP traffic. The second device 120 may receive feedback information indicating the failure of the PTM initial transmission and/or the PTP initial transmission. In such a case, the second device 120 determines to perform a retransmission for the PTM initial transmission and/or the PTP initial transmission. In some example embodiments, the second device 120 may perform more than one retransmission for the PTM initial transmission and/or the PTP initial transmission. In either case of the PTM initial transmission and/or the PTP initial transmission, the retransmission to the first device 110 is performed through a PTP way.

In some example embodiments, for the PTM initial transmission and/or the PTP initial transmission, the first device 110 may transmit HARQ ACK/NACK feedback depending on whether the PTM traffic and/or the PTP traffic is successfully decoded. In some example embodiments, the first device 110 may transmit NACK-only feedback in the case of failure to decode the PTM traffic and/or the PTP traffic, and will not send any feedback if the first device 110 is able to successfully receive and decode the PTM traffic and/or the PTP traffic.

Depending on whether the retransmission for the PTM initial transmission and/or the PTP initial transmission, the second device 120 determines 425 an information combination of at least one of the following: at least one field of control information for the retransmission, a search space for the control information, and a format of the control information. The control information is transmitted to the first device 110 to convey scheduling information for the retransmission. In some example embodiments, the control information may include DCI. The information combination is determined in such a way to differentiate a source traffic type of the retransmission to be performed, i.e., whether the retransmission is for traffic in the PTM initial transmission and/or the PTP initial transmission. Based on the combination of the above-mentioned fields, the first device 110 can also determine whether the received DCI indicates a retransmission or initial transmission.

The second device 120 transmits 430 the corresponding control information to the first device 110 based on the determined information combination. Depending on the determined information combination, one or more fields of the control information and/or the format of the control information may be determined in generating the control information to be transmitted, and/or the generated control information may be transmitted within the search space involved in the control information.

As such, by receiving 435 the control information, the first device 110 determines 440 the source traffic type of the retransmission based on the information combination. The first device 110 can determine from the control information that a retransmission is to be scheduled from the second device 120. For example, the control information may include a NDI field with different values to indicate whether the scheduled transmission is an initial transmission (e.g., with a value of "1") or a retransmission (e.g., with a value of "0").

In accordance with example embodiments of the present disclosure, through the specific information combination, the second device 120 can inform the first device 110 of the source traffic type of the retransmission. Various combinations of one or more fields in the control information, the search space, and the format of the control information may be applied to indicate whether the retransmission is for traffic in the PTM initial transmission or not. The search space and the format of the control information may need to be determined when the second device 120 transmits the control information and when the first device 110 successfully receives and decode the control information. In addition, one or more existing fields in the control information may be reused and set in a certain way to indicate the source traffic type of the retransmission. In various embodiments of such information combination, the one or more fields in the control information, the search space, and the format of the control information may be carefully determined to have a special interpretation for the source traffic type of the retransmission, without impact on the scheduling functions of the control information per se.

To better understand the example embodiments of the present disclosure, the search space and the format of the control information will be briefly introduced first.

Control information is received via blind decoding on a channel (e.g., a PDCCH) over which the control information is possibly transmitted. The number of times of blind-decoding of a PDCCH may be limited by the number of formats of control information configured to be monitored, the number of RNTIs configured for the formats, the number of PDCCH candidates, and the total number of control channel elements (CCEs) constituting a search space.

There are a number of different formats for control information. The formats of control information may be classified by the use, the number of bits, or the like. There are formats for control information having the same number of bits or the different number of bits. Example formats of DCI include DCI format 1_0, DCI format 1_1, DCI format 1_2 and possible other formats. There may also be DCI formats which are designed using formats 1_0, 1_1 and 1_2 as a baseline-thereby reusing some of the fields from these formats and either fixing the values of the other fields or configuring them dynamically.

A search space representing a set of resource elements such as CCEs is defined for blind decoding. Search spaces may be classified into a common search space (CSS) and a UE-specific search space (USS). The search space (groups of resource elements to be decoded) of a physical downlink control signal (PDCCH) is limited based on a cell-radio network temporary identity (C-RNTI) that is a terminal device identity. This space determined for each terminal device is referred to as an USS. In contrast, a CSS is a search space in which a group of terminal devices or all terminal devices in a cell search commonly the PDCCH, separately from the USS. That is, the CSS is a search space commonly determined for a group of terminal devices or all the terminal devices in a cell.

Generally, the first device 110 may obtain configuration related to one or more possible formats of control information and one or more possible search spaces for the multicast/broadcast service and/or the unicast service. In some cases, the first device 110 may also be configured with one or more RNTIs (e.g., G-RNTI for multicast/PTM, C-RNTI for unicast/PTP, etc.). The second device 120 may determine a format of control information to be transmitted and the resource elements of a certain search space for transmitting the control information. The first device 110 may monitor the configured format(s) of control information in the configured search space(s), to perform the blind decoding of the control information.

In some example embodiments, when transmitting control information for a retransmission for a PTM initial transmission, a combination of a certain format of the control information and a certain search space may be determined by the second device 120 to indicate to the first device 110 that the retransmission is for traffic in a PTM initial transmission. At the side of the first device 110, if the control information is decoded in a search space with a certain format, the first device 110 may determine whether the format of the control information is configured for the search space. If the format of the control information is determined to be a format not configured for the search space, the first device 110 may determine that the source traffic type of the retransmission indicates that the retransmission is for traffic in the PTM initial transmission. That is to say, if the first device 110 finds that a format that is not supposed to be used in a search space is now used in the search space, the first device 110 may assume or determine that such a combination of the format and the search space indicates that the retransmission is for traffic in the PTM initial transmission.

In some examples, if the control information is DCI and is decoded in a CSS using either DCI format 1_1 or DCI format 1_2, then the first device 110 may determine the source traffic type of the retransmission indicating that the retransmission is for traffic in the PTM initial transmission. Typically, DCI format 1_1 and DCI format 1_2 are not configured for use in the CSS, especially in PTM communication. Thus, a combination of CSS and DCI format 1_1 or DCI format 1_2 may be used to indicate that the retransmission is for traffic in the PTM initial transmission. In some examples, if the control information is scrambled with C-RNTI, and the first device 110 uses the C-RNTI to de-scramble the control information and successfully decode the control information in the CSS using either DCI format 1_1 or DCI format 1_2, the first device 110 may determine that the retransmission is for traffic in the PTM initial transmission.

In some example embodiments, some fields in the control information may be reused and their values may be set to indicate the source traffic type of the retransmission. Since the control information contains a NDI field to indicate that a retransmission is to be scheduled, the first device 110 may determine the source traffic type of the retransmission from the information combination of fields in the control information, to decide whether the retransmission is for traffic in the PTM initial transmission.

In some example embodiments, the first device 110 may determine whether the retransmission is for traffic in the PTM initial transmission based on an information combination of one or more specific fields of the control information. In some example embodiments, the fields in the control information, which would be otherwise unused or of which some values would be otherwise unused for PTM communications, may be reused in order to indicate that the control information is intended for a retransmission of the PTM initial transmission, not intended for a retransmission of the PTP initial transmission. As such, it is possible to differentiate between a retransmission for a PTM initial transmission or a retransmission for a PTP initial transmission.

In some example embodiments, the first device 110 may determine that the format of the control information is a format configured for the search space in which the control information. If the format of the control information is configured for the search space, which means that the combination of the format and the search space is not special enough to imply the retransmission for the PTM initial transmission. The fields of the control information may be reused.

In some example embodiments, the first device 110 may check a field for an identifier for the format of the control information, a field for a transmit power control (TPC) command, and/or a field for frequency domain resource allocation (FDRA). For example, a format for DCI includes a field for an identifier of DCI format, which may be set to 0 or 1, a field for a TPC command for scheduled PUCCH, and a field for FDRA.

One or more of those fields may be set to respective predefined values. The predefined values may be known by both the first device 110 and the second device 120. The information combination of the predefined values in the fields may indicate that the retransmission scheduled by the control information is for traffic in the PTM initial transmission.

In some example embodiments, DCI format 1_0 is configured for the CSS. In the condition of DCI format 1_0 is used to decode the control information in the CSS, the first device 110 may determine if the field for an identifier for the format of the control information is set to "0" and the field for the TPC command is set to a specific value that is predefined to indicate the intention of the control information. In some examples, the field for the TPC command may be of 2 bits and the specific predefined value for the field for the TPC command may be set to "00," "11," or any other value predefined between the first device 110 and the second device 120.

In some example embodiments, the size of the field for FDRA may be variable. In some example embodiments where DCI format 1_0 is used to decode the control information in the CSS, the first device 110 may determine if a size of the field for FDRA is dimensioned based on a size of a common frequency resource (CFR). If the size of the field for FDRA is dimensioned based on the size of the CFR, the first device 110 may determine that the control information is not intended for a retransmission of the PTP initial transmission and thus the retransmission scheduled by the control information is for traffic in the PTM initial transmission.

The size of the CFR may be configured from the second device 120, for example, via higher-layer signaling. In order to indicate the source traffic type of the retransmission to the first device 110, the second device 120 may determine the size of the field for FDRA based on the size of the CFR configured to the first device 110, for example, determine the size of the field for FDRA to be substantially equal to the size of the CFR. The first device 110 may attempt to decode the control information by trying to change the size of the FDRA. If the control information is successfully decoded with the changed size of the FDRA equal to the size of the CFR, the first device 110 may assume that the retransmission is for traffic in the PTM initial transmission.

As some alternatives or in addition, a field for a carrier indicator, and a field for a BWP indicator may also be used to indicate the intention of the control information and then the source traffic type of the retransmission. The fields for the carrier indicator and for a BWP may be set to certain predefined values that are known by both the first device 110 and the second device 120. The information combination of the predefined values in the fields may indicate that the control information is not intended for a retransmission of the PTP initial transmission and thus the retransmission scheduled by the control information is for traffic in the PTM initial transmission.

In some example embodiments, if the control information is decoded in either USS or CSS using either DCI format 1_1 or DCI format 1_2, the first device 110 may determine if the field for an identifier for the format of the control information is set to "0" along with the field for a carrier indicator and the field for a BWP are set to respective predefined values. In some examples, the sizes of the field for a carrier indicator and the field for a BWP are variable. The two fields may be set to all "1"s or all "0"s, or any other value predefined between the first device 110 and the second device 120, to indicate that that the retransmission is for traffic in the PTM initial transmission.

In some examples, if the control information is decoded in either USS or CSS using either DCI format 1_1 or DCI format 1_2, the field for an identifier for the format of the control information is set to "1" with the field for TPC command, the field for a carrier indicator and the field for a BWP are variable are set to respective predefined values (e.g., all "1'"s or all "0"s, or any other predefined value).

Several example fields in the control information reused to indicate the source traffic type of the retransmission have been discussed above. In some example embodiments, a subset of the fields may be used to indicate that the retransmission scheduled by the control information is for traffic in the PTM initial transmission.

In some example embodiments, if the control information is decoded in either USS or CSS using either DCI format 1_1 or DCI format 1_2, an information combination of the field for an identifier for the format of the control information and the field for a TPC command may be set to their respective predefined values to indicate that the control information is not intended for a retransmission of the PTP initial transmission and the retransmission is for traffic in the PTM initial transmission. In some example embodiments, if the control information is decoded in either USS or CSS using either DCI format 1_1 or DCI format 1_2, an information combination of the field for the carrier indicator and for a BWP may be set to certain predefined values may be set to their respective predefined values to indicate that the retransmission is for traffic in the PTM initial transmission.

In some example embodiments, if the control information is decoded in USS using DCI format 1_0, an information combination of the field for an identifier for the format of the control information and the field for a TPC command may be set to their respective predefined values. For example, the field for an identifier for the format of the control information may be set to "0" while the field for a TPC command may be set to "00," "11," or any other value predefined between the first device 110 and the second device 120.

In some example embodiments, if the control information is decoded in either USS or USS using DCI format 1_0, an information combination of the field for an identifier for the format of the control information and the field for a TPC command may be set to their respective predefined values.

In some example embodiments, if the control information is decoded in USS using either DCI format 1_1 or DCI format 1_2, the first device 110 may determine if the size of the field for FDRA is dimensioned based on a size of a CFR configured by the second device 120. If the size of the field for FDRA is dimensioned based on the size of the CFR (e.g., the sizes are substantially equal to each other), the first device 110 may determine that the retransmission scheduled by the control information is for the PTM initial transmission. The FDRA field is used by the second device 120 to inform the first device 110 about the frequency domain resources over which the downlink traffic is scheduled. Conventionally, the size of the FDRA field could be set as the size of the bandwidth part where the traffic is scheduled or the size of the initial bandwidth part (if configured) or control resource set #0—which is configured using broadcast signaling for all the UEs in a cell.

The second device 120 may generate the control information by setting the predefined values in the corresponding fields and/or the size of the FDRA if it decides to schedule a retransmission for the previous PTP initial transmission. In some example embodiments, the second device 120 select the search space and the format of the control information to ensure that the information combination of the search space, the format, and the field(s) in the control information can indicate that the retransmission is for traffic in the PTM initial transmission.

In some cases, the first device 110 may utilize the above-discussed information combination in certain conditions. In some example embodiments, the first device 110 may determine whether a PTP retransmission is allowed for the PTM initial transmission before deciding the source traffic type. In some example embodiments, the first device 110 may determine whether a predefined type of the codebook is used for decoding traffic or data received from the second device 120. The type of the codebook may specify soft-combination of traffic decoded from transmissions with the same HARQ process ID.

The codebook may be configured by the second device 120, for example, via higher-layer signaling. In some examples, the type of the codebook may include Type-1 HARQ ACK codebook.

In some example embodiments, PTM may be supported on one or more certain BWPs. The first device 110 may determine whether the PTM is supported on the current active BWP before it detects the information combination to determine whether the retransmission is for traffic in the PTM initial transmission.

Still referring to FIG. 4, the second device 120 may perform 445 the retransmission as indicated in the control information. The first device 110 may attempt to detect 460 the retransmission. The first device 110 may detect and then try to decode traffic contained in the retransmission based on the control information. As the second device 120 can determine if the retransmission is for traffic in the PTM initial transmission or the PTP initial transmission, it can handle the retransmission correctly.

For example, the first device 110 may receive both control information for the PTM initial transmission and the PTP initial transmission, indicating that the same HARQ process ID is used for the two initial transmissions. If the first device 110 determines that the received retransmission is for traffic in the PTM initial transmission, it may detect the PTM traffic from the retransmission and possibly combine the detected PTM traffic with the PTM initial transmission, so as to decode the complete PTM traffic. In other cases, if the first device 110 determines that the received retransmission is for traffic in the PTP initial transmission, it may combine the detected PTP traffic with the PTP traffic initial transmission.

Figure 5:
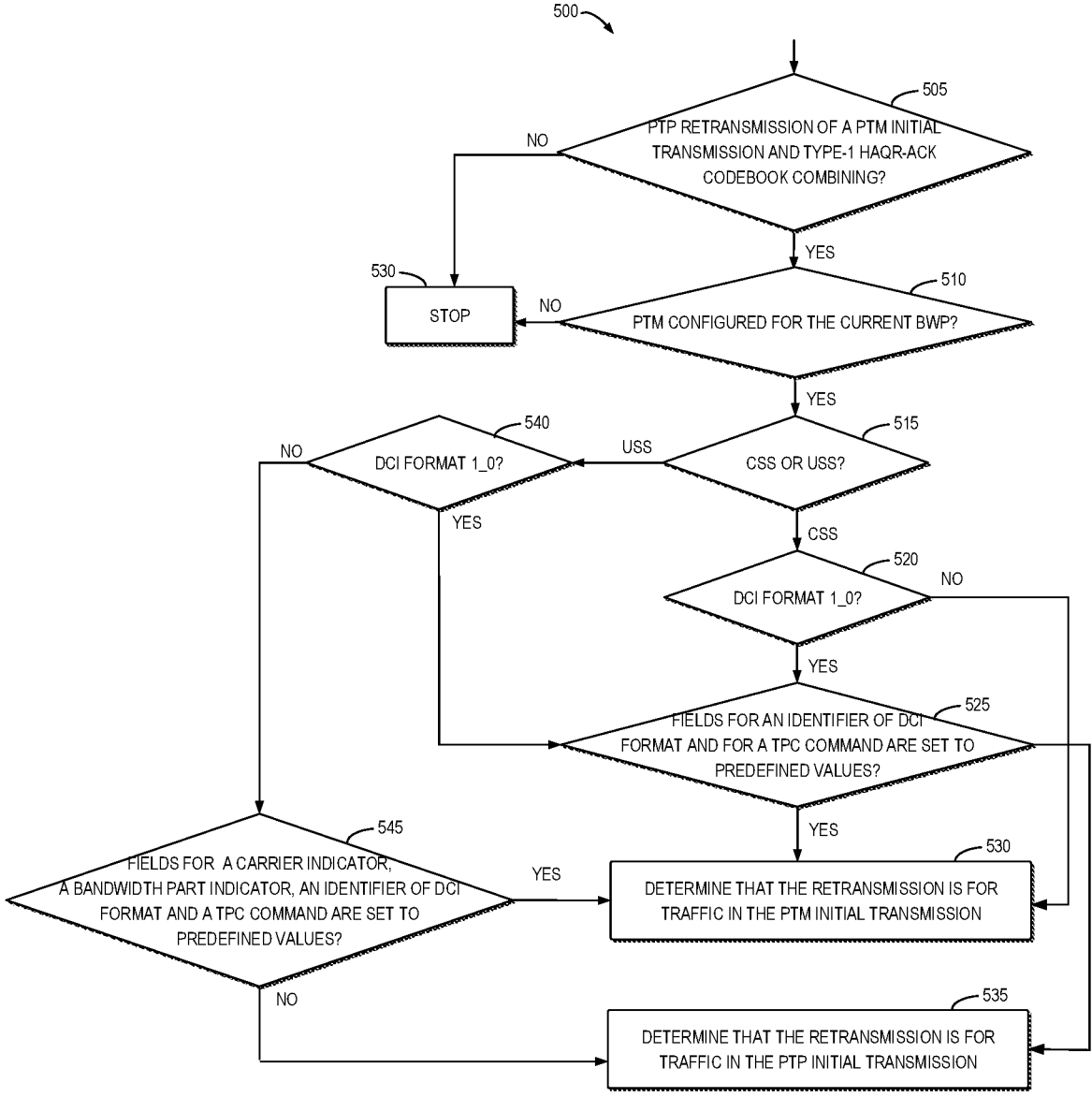
FIG. 5 illustrates a flowchart of an example process for determining a source traffic type of a retransmission in accordance with some example embodiments of the present disclosure.

Various example embodiments related to the configuration and interpretation of control information has been discussed above. A specific example process 500 for interpreting the control information by the first device 110 according to an example embodiment is illustrated in FIG. 5. It is understood that the example process 500 is merely an example and other variations have been discussed and can be anticipated based on the embodiments discussed herein. In the example embodiment of FIG. 5, DCI is used as example control information.

At block 505, the first device 110 determines whether a PTP retransmission is allowed for the PTM initial transmission and a predefined type of the codebook is used for decoding traffic from the second device 120. If the PTP retransmission is not allowed and/or the predefined type of the codebook is not used, the process 400 ends and the first device 110 may not need to detect the information combination of the field(s), the format, and/or the search space. Otherwise, the process 500 proceeds to block 510, where the first device 110 determines whether PTM is configured for the current active BWP. If PTM is not configured for the current active BWP, the process 400 ends and the first device 110 may not need to detect the information combination of the field(s), the format, and/or the search space. It is noted the order of blocks 505 and 510 may be changed.

If it is determined at block 510 that PTM is configured for the current active BWP, the first device 110 determines, at block 515, whether the control information is decoded in CSS or USS. If the control information is decoded in the CSS, at block 520, the first device 110 determines whether the format of the control information is DCI format 1_0. If the format of the control information is DCI format 1_0, at block 525, the first device 110 further checks one or more fields of the control information, for example, fields for an identifier of the DCI format and for a TPC command are set to respective predefined values. For example, the first device 110 may determine whether the field for the identifier of the DCI format is set to "0" and the field for a TPC command is set to "11" or other predefined value.

If those fields are set to respective predefined values at block 525, the first device 110 determines at block 530 that the retransmission is for traffic in the PTM initial transmission. If those fields are not set to the respective predefined values, the first device 110 determines at block 535 that the retransmission is for traffic in the PTP initial transmission. If it is determined at block 525 that the format of the control information is not DCI format 1_0 (e.g., but is DCI format 1_1 or 1_2), the first device 110 may directly determine that the retransmission is for traffic in the PTM initial transmission at block 530.

If the control information is decoded in the USS at block 540, the first device 110 further determines whether the format of the control information is DCI format 1_0. If the format of the control information is DCI format 1_0, the process 500 proceeds to block 525 to further checks the fields of the control information as discussed above. If it is determined at block 540 that the format of the control information is not DCI format 1_0 (e.g., but is DCI format 1_1 or 1_2), the first device 110 may further check at block 545 whether other fields of the control information, for example, fields for a carrier indicator, a BWP, an identifier of the DCI format and for a TPC command are set to respective predefined values. For example, the first device 110 may determine whether the field for identifier of the DCI format is set to "0" and other fields are set to all "1"s, all "0"s or any other predefined value. If those fields are set to respective predefined values at block 545, the first device 110 determines at block 530 that the retransmission is for traffic in the PTM initial transmission. If those fields are not set to the respective predefined values, the first device 110 determines at block 535 that the retransmission is for traffic in the PTP initial transmission.

In the process 400, it is noted that it is a relatively simpler embodiment when DCI format 1_1 or 1_2 is scheduled using the CSS and is used for retransmissions. The information combination of the format and the search space may indicate that the retransmission is for traffic in the PTM initial transmission. Other scenarios could also be considered where one of the longer DCI formats 1_1/1_2 is used where fields such as the BWP indicator and the carrier indicator are also used to indicate the retransmission for the PTM initial transmission. In some cases, with DCI format 1_0, the dimensioning of the field for FDRA may also be used as an indication that the retransmission is for traffic a PTM initial transmission.

Figure 6:
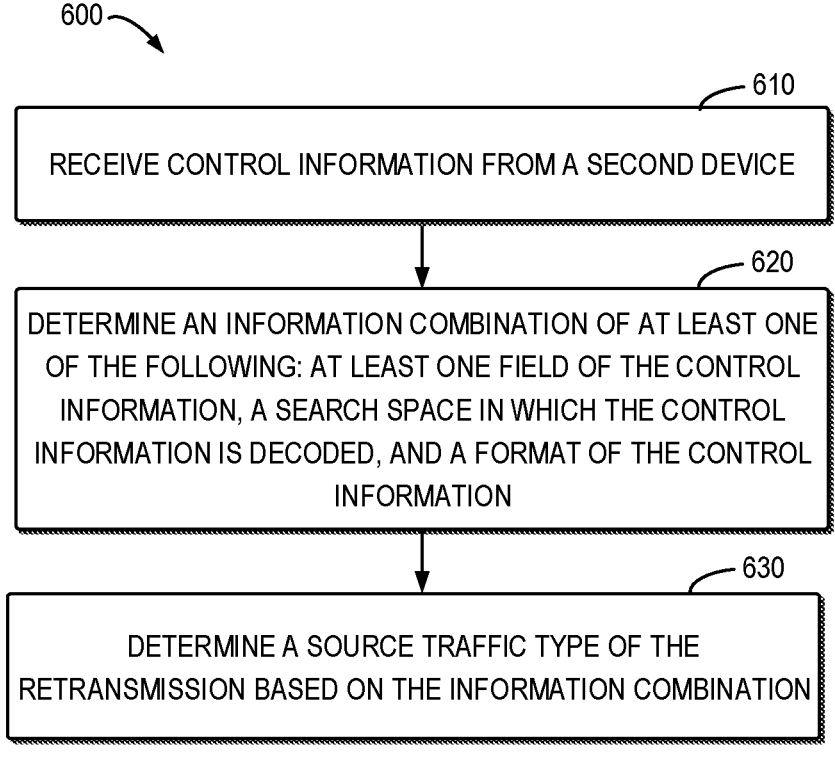
FIG. 6 illustrates a flowchart of an example process implemented at a first device in accordance with some example embodiments of the present disclosure.

FIG. 6 shows a flowchart of an example process 600 implemented at a second device in accordance with some example embodiments of the present disclosure. The process 600 may be implemented at a first device 110 in the communication environment 100 of FIG. 1. For the purpose of discussion, the process 600 will be described from the perspective of the first device 110 with respect to FIG. 1.

At block 610, the first device 110 receives control information from a second device. At block 620, in accordance with a determination that the control information indicates a retransmission to be scheduled from the second device, the first device 110 determines an information combination of at least one of the following: at least one field of the control information, a search space in which the control information is received, and a format of the control information. At block 630, the first device 110 determines a source traffic type of the retransmission based on the information combination, the source traffic type of the retransmission indicating whether the retransmission is for traffic in a point-to-multipoint initial transmission or in a point-to-point initial transmission.

In some example embodiments, determining the source traffic type of the retransmission comprises: in accordance with a determination that the format of the control information is a format not configured for the search space, determining that the source traffic type of the retransmission indicates that the retransmission is for the traffic in the point-to-multipoint initial transmission.

In some example embodiments, determining that the source traffic type of the retransmission indicates that the retransmission is for the traffic in the point-to-multipoint initial transmission comprises: in accordance with a determination that the search space is a common search space, and a determination that the format of the control information is downlink control information format 1_1 or downlink control information format 1_2, determining that the source traffic type of the retransmission indicates that the retransmission is for the traffic in the point-to-multipoint initial transmission.

In some example embodiments, determining, based on the at least one field of the control information, that the source traffic type of the retransmission indicates that the retransmission is for the traffic in the point-to-multipoint initial transmission.

In some example embodiments, determining, based on the at least one field of the control information, that the source traffic type of the retransmission indicates that the retransmission is for the traffic in the point-to-multipoint initial transmission comprises: in accordance with a determination that the format of the control information is a format configured for the search space, determining, based on the at least one field of the control information, that the source traffic type of the retransmission indicates that the retransmission is for the traffic in the point-to-multipoint initial transmission.

In some example embodiments, the determining that the source traffic type of the retransmission indicates that the retransmission is for the traffic in the point-to-multipoint initial transmission is in accordance with at least one of the following: a determination that a first field for an identifier for the format of the control information is set to a first predefined value, a determination that a second field for a transmit power control command is set to a second predefined value, a determination that a size of information contained in a third field for frequency domain resource allocation is dimensioned based on a size of a common frequency resource, a determination that a fourth field for a carrier indicator is set to a third predefined value, and a determination that a fifth field for a bandwidth part indicator is set to a fourth predefined value.

In some example embodiments, the determining that the source traffic type of the retransmission indicates that the retransmission is for the traffic in the point-to-multipoint initial transmission is in accordance with: a determination that the search space is a user equipment-specific search space or a common search space, and the format of the control information is downlink control information format 1_0, a determination that the first field is set to the first predefined value, and a determination that the second field is set to the second predefined value.

In some example embodiments, the determining that the source traffic type of the retransmission indicates that the retransmission is for the traffic in the point-to-multipoint initial transmission is in accordance with: a determination that the search space is a common search space and the format of the control information is downlink control information format 1_1 or downlink control information format 1_2, and a determination that the size of information contained in the third field is dimensioned based on the size of the common frequency resource.

In some example embodiments, determining the source traffic type of the retransmission based on the information combination is in accordance with at least one of the following: a determination that a point-to-point retransmission is allowed for the point-to-multi-point initial transmission, and a determination that a predefined type of codebook is used for decoding traffic received from the second device.

FIG. 7 shows a flowchart of an example process 700 implemented at a second device in accordance with some example embodiments of the present disclosure. The process 700 may be implemented at a second device 120 in the communication environment 100 of FIG. 1. For the purpose of discussion, the process 700 will be described from the perspective of the second device 120 with respect to FIG. 1.

At block 710, the second device 120 determines whether a retransmission to be scheduled is for traffic in a point-to-multipoint initial transmission or in a point-to-point initial transmission. At block 720, the second device 120 determines, based on a determination of whether the retransmission is for the traffic in the point-to-multipoint initial transmission or in the point-to-point initial transmission, an information combination of at least one of the following: at least one field of control information for the retransmission, a search space for the control information, and a format of the control information. At block 730, the second device 120 transmits the control information to the first device based on the determined information combination, the control information indicating that the retransmission is scheduled.

In some example embodiments, determining the information combination comprises: in accordance with a determination that the retransmission is for the traffic in the point-to-multipoint initial transmission, determining the format of the control information and the search space such that the format of the control information is a format not configured for the search space.

In some example embodiments, the search space is a common search space, and wherein the format of the control information is downlink control information format 1_1 or downlink control information format 1_2.

In some example embodiments, determining the information combination comprises: in accordance with a determination that the retransmission is for the traffic in the point-to-multipoint initial transmission, determining the format of the control information, and determining the at least one field of the control information to indicate that the retransmission is for the traffic in the point-to-multipoint initial transmission.

In some example embodiments, determining the at least one field of the control information comprises: determining the format of the control information and the search space such that the determined format is a format configured for the determined search space.

In some example embodiments, determining the at least one field of the control information comprises: setting a first field for an identifier for the format of the control information to a first predefined value, setting a second field for a transmit power control command to a second predefined value, setting a size of information contained in a third field for frequency domain resource allocation based on a size of a common frequency resource, setting a fourth field for a carrier indicator to a third predefined value, and setting that a fifth field for a bandwidth part indicator to a fourth predefined value.

In some example embodiments, determining the at least one field of the control information comprises: in accordance with a determination that the search space is a user equipment-specific search space or a common search space, and the format of the control information is downlink control information format 1_0, setting the first field to the first predefined value, and setting the second field to the second predefined value.

In some example embodiments, determining the at least one field of the control information comprises: in accordance with a determination that the search space is a common search space and the format of the control information is downlink control information format 1_1 or downlink control information format 1_2, setting the size of information contained in the third field based on the size of the common frequency resource.

In some example embodiments, a first apparatus capable of performing any of the process 600 (for example, the first device 110) may comprise means for performing the respective operations of the process 600. The means may be implemented in any suitable form. For example, the means may be implemented in a circuitry and/or software module. The first apparatus may be implemented as or included in the first device 110.

In some example embodiments, the first apparatus comprises means for receiving control information from a second apparatus (e.g., the second device 120); means for, in accordance with a determination that the control information indicates a retransmission to be scheduled from the second apparatus, determining an information combination of at least one of the following: at least one field of the control information, a search space in which the control information is received, and a format of the control information; and means for determining a source traffic type of the retransmission based on the information combination, the source traffic type of the retransmission indicating whether the retransmission is for traffic in a point-to-multipoint initial transmission or in a point-to-point initial transmission.

In some example embodiments, the means for determining the source traffic type of the retransmission comprises means for: in accordance with a determination that the format of the control information is a format not configured for the search space, determining that the source traffic type of the retransmission indicates that the retransmission is for the traffic in the point-to-multipoint initial transmission.

In some example embodiments, the means for determining that the source traffic type of the retransmission indicates that the retransmission is for the traffic in the point-to-multipoint initial transmission comprises: means for, in accordance with a determination that the search space is a common search space, and a determination that the format of the control information is downlink control information format 1_1 or downlink control information format 1_2, determining that the source traffic type of the retransmission indicates that the retransmission is for the traffic in the point-to-multipoint initial transmission.

In some example embodiments, the means for determining the source traffic type of the retransmission comprises: means for determining, based on the at least one field of the control information, that the source traffic type of the retransmission indicates that the retransmission is for the traffic in the point-to-multipoint initial transmission.

In some example embodiments, the means for determining, based on the at least one field of the control information, that the source traffic type of the retransmission indicates that the retransmission is for the traffic in the point-to-multipoint initial transmission: means for, in accordance with a determination that the format of the control information is a format configured for the search space, determining, based on the at least one field of the control information, that the source traffic type of the retransmission indicates that the retransmission is for the traffic in the point-to-multipoint initial transmission.

In some example embodiments, the means for determining that the source traffic type of the retransmission indicates that the retransmission is for the traffic in the point-to-multipoint initial transmission is in accordance with at least one of the following: a determination that a first field for an identifier for the format of the control information is set to a first predefined value, a determination that a second field for a transmit power control command is set to a second predefined value, a determination that a size of information contained in a third field for frequency domain resource allocation is dimensioned based on a size of a common frequency resource, a determination that a fourth field for a carrier indicator is set to a third predefined value, and a determination that a fifth field for a bandwidth part indicator is set to a fourth predefined value.

In some example embodiments, the means for determining that the source traffic type of the retransmission indicates that the retransmission is for the traffic in the point-to-multipoint initial transmission is in accordance with: a determination that the search space is a user equipment-specific search space or a common search space, and the format of the control information is downlink control information format 1_0, a determination that the first field is set to the first predefined value, and a determination that the second field is set to the second predefined value.

In some example embodiments, the means for determining that the source traffic type of the retransmission indicates that the retransmission is for the traffic in the point-to-multipoint initial transmission is in accordance with: a determination that the search space is a common search space and the format of the control information is downlink control information format 1_1 or downlink control information format 1_2, and a determination that the size of information contained in the third field is dimensioned based on the size of the common frequency resource.

In some example embodiments, the means for determining the source traffic type of the retransmission based on the information combination is in accordance with at least one of the following: a determination that a point-to-point retransmission is allowed for the point-to-multi-point initial transmission, and a determination that a predefined type of codebook is used for decoding traffic received from the second apparatus.

In some example embodiments, the first apparatus further comprises means for performing other operations in some example embodiments of the process 600 or the first apparatus 110. In some example embodiments, the means comprises at least one processor; and at least one memory including computer program code, the at least one memory and computer program code configured to, with the at least one processor, cause the performance of the first apparatus.

In some example embodiments, a second apparatus capable of performing any of the process 700 (for example, the second device 120) may comprise means for performing the respective operations of the process 700. The means may be implemented in any suitable form. For example, the means may be implemented in a circuitry and/or software module. The second apparatus may be implemented as or included in the second device 120.

In some example embodiments, the second apparatus comprises means for determining whether a retransmission to be scheduled is for traffic in a point-to-multipoint initial transmission or in a point-to-point initial transmission; means for determining, based on a determination of whether the retransmission is for the traffic in the point-to-multipoint initial transmission or in the point-to-point initial transmission, an information combination of at least one of the following: at least one field of control information for the retransmission, a search space for the control information, and a format of the control information; and means for transmitting the control information to the first apparatus (e.g., the first device 110) based on the determined information combination, the control information indicating that the retransmission is scheduled.

In some example embodiments, the means for determining the information combination comprises means for: in accordance with a determination that the retransmission is for the traffic in the point-to-multipoint initial transmission, determining the format of the control information and the search space such that the format of the control information is a format not configured for the search space.

In some example embodiments, the search space is a common search space, and wherein the format of the control information is downlink control information format 1_1 or downlink control information format 1_2.

In some example embodiments, the means for determining the information combination comprises means for: in accordance with a determination that the retransmission is for the traffic in the point-to-multipoint initial transmission, determining the format of the control information, and determining the at least one field of the control information to indicate that the retransmission is for the traffic in the point-to-multipoint initial transmission.

In some example embodiments, the means for determining the at least one field of the control information comprises: means for determining the format of the control information and the search space such that the determined format is a format configured for the determined search space.

In some example embodiments, the means for determining the at least one field of the control information comprises: means for setting a first field for an identifier for the format of the control information to a first predefined value, means for setting a second field for a transmit power control command to a second predefined value, means for setting a size of information contained in a third field for frequency domain resource allocation based on a size of a common frequency resource, means for setting a fourth field for a carrier indicator to a third predefined value, and means for setting that a fifth field for a bandwidth part indicator to a fourth predefined value.

In some example embodiments, the means for determining the at least one field of the control information comprises means for: in accordance with a determination that the search space is a user equipment-specific search space or a common search space, and the format of the control information is downlink control information format 1_0, setting the first field to the first predefined value, and setting the second field to the second predefined value.

In some example embodiments, the means for determining the at least one field of the control information comprises means for: in accordance with a determination that the search space is a common search space and the format of the control information is downlink control information format 1_1 or downlink control information format 1_2, setting the size of information contained in the third field based on the size of the common frequency resource.

In some example embodiments, the second apparatus further comprises means for performing other operations in some example embodiments of the process 700 or the second device 120. In some example embodiments, the means comprises at least one processor; and at least one memory including computer program code, the at least one memory and computer program code configured to, with the at least one processor, cause the performance of the second apparatus.

Figure 8:
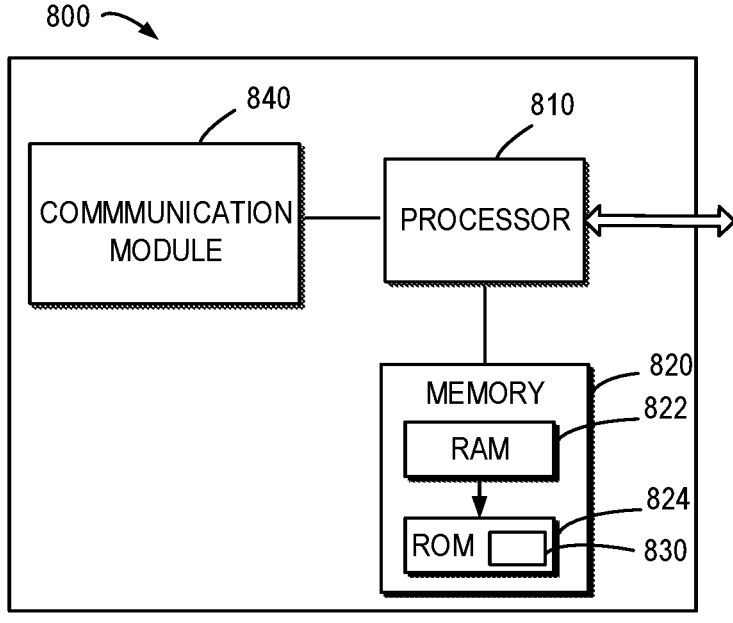
FIG. 8 illustrates a simplified block diagram of a device that is suitable for implementing example embodiments of the present disclosure.

FIG. 8 is a simplified block diagram of a device 800 that is suitable for implementing example embodiments of the present disclosure. The device 800 may be provided to implement a communication device, for example, the first device 110 or the second device 120 as shown in FIG. 1. As shown, the device 800 includes one or more processors 810, one or more memories 820 coupled to the processor 810, and one or more communication modules 840 coupled to the processor 810.

The communication module 840 is for bidirectional communications. The communication module 840 has one or more communication interfaces to facilitate communication with one or more other modules or devices. The communication interfaces may represent any interface that is necessary for communication with other network elements. In some example embodiments, the communication module 840 may include at least one antenna.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the memory, e.g., ROM 824. The processor 810 may perform any suitable actions and processing by loading the program 830 into the RAM 822.

The example embodiments of the present disclosure may be implemented by means of the program 830 so that the device 800 may perform any process of the disclosure as discussed with reference to FIGS. 4 to 7. The example embodiments of the present disclosure may also be implemented by hardware or by a combination of software and hardware.

Figure 9:
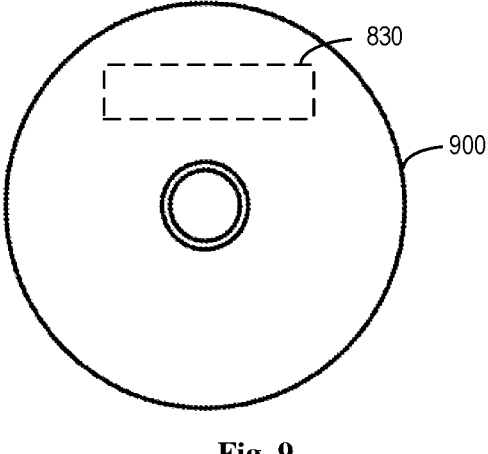
FIG. 9 illustrates a block diagram of an example computer readable medium in accordance with some example embodiments of the present disclosure.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 900 which may be in form of CD, DVD or other optical storage disk. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 4 to 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
at least one processor; and
at least one memory including computer program code;
wherein the at least one memory and the computer program code are configured to, with the at least one processor, cause the first device to:
receive control information from a second device;
in accordance with a determination that the control information indicates a retransmission to be scheduled from the second device, determine an information combination of the following: at least one field of the control information, a search space in which the control information is received, and a format of the control information; and
determine a source traffic type of the retransmission based on the information combination, the source traffic type of the retransmission indicating whether the retransmission is for traffic in a point-to-multipoint initial transmission or in a point-to-point initial transmission.

2. The first device of claim 1, wherein the at least one memory and the computer program code are configured to, with the at least one processor, cause the first device to determine, based on at least one field of the control information, that the source traffic type of the retransmission indicates that the retransmission is for the traffic in the point-to-multipoint initial transmission.

3. The first device of claim 2, wherein the at least one memory and the computer program code are configured to, with the at least one processor, cause the first device to determine, based on the at least one field of the control information, that the source traffic type of the retransmission indicates that the retransmission is for the traffic in the point-to-multipoint initial transmission, in accordance with a determination that the format of the control information is a format configured for the search space.

4. The first device of claim 2, wherein the at least one memory and the computer program code are configured to, with the at least one processor, cause the first device to determine that the source traffic type of the retransmission indicates that the retransmission is for the traffic in the point-to-multipoint initial transmission in accordance with of the following:
a determination that a first field for an identifier for the format of the control information is set to a first predefined value,
a determination that a second field for a transmit power control command is set to a second predefined value,
a determination that a size of information contained in a third field for frequency domain resource allocation is dimensioned based on a size of a common frequency resource,
a determination that a fourth field for a carrier indicator is set to a third predefined value, and a determination that a fifth field for a bandwidth part indicator is set to a fourth predefined value.

5. The first device of claim 4, wherein the at least one memory and the computer program code are configured to, with the at least one processor, cause the first device to determine that the source traffic type of the retransmission indicates that the retransmission is for the traffic in the point-to-multipoint initial transmission in accordance with:
a determination that the search space is a user equipment-specific search space or a common search space, and the format of the control information is downlink control information format 1_0,
a determination that the first field is set to the first predefined value, and
a determination that the second field is set to the second predefined value.

6. The first device of claim 4, wherein the at least one memory and the computer program code are configured to, with the at least one processor, cause the first device to determine that the source traffic type of the retransmission indicates that the retransmission is for the traffic in the point-to-multipoint initial transmission in accordance with:
a determination that the search space is a common search space and the format of the control information is downlink control information format 1_1 or downlink control information format 1_2, and
a determination that the size of information contained in the third field is dimensioned based on the size of the common frequency resource.

7. The first device of claim 1, wherein the at least one memory and the computer program code are configured to, with the at least one processor, cause the first device to determine the source traffic type of the retransmission based on the information combination in accordance with at least one of the following:
a determination that a point-to-point retransmission is allowed for the point-to-multi- point initial transmission, and
a determination that a predefined type of codebook is used for decoding traffic received from the second device.

8. A second device comprising:
at least one processor; and
at least one memory including computer program code;
wherein the at least one memory and the computer program code are configured to, with the at least one processor, cause the second device to:
determine whether a retransmission to be scheduled is for traffic in a point-to- multipoint initial transmission or in a point-to-point initial transmission;
determine, based on a determination of whether the retransmission is for the traffic in the point-to-multipoint initial transmission or in the point-to-point initial transmission, an information combination of the following: at least one field of control information for the retransmission, a search space for the control information, and a format of the control information; and
transmit the control information to a first device based on the determined information combination, the control information indicating that the retransmission is scheduled.

9. The second device of claim 8, wherein the at least one memory and the computer program code are configured to, with the at least one processor, cause the second device to determine the information combination by:
in accordance with a determination that the retransmission is for the traffic in the point- to-multipoint initial transmission, determining the format of the control information and the search space such that the format of the control information is a format not configured for the search space.

10. The second device of claim 9, wherein the search space is a common search space, and wherein the format of the control information is downlink control information format 1_1 or downlink control information format 1_2.

11. The second device of claim 8, wherein the at least one memory and the computer program code are configured to, with the at least one processor, cause the second device to determine the information combination by:

in accordance with a determination that the retransmission is for the traffic in the point-to- multipoint initial transmission, determining the format of the control information, and determining the at least one field of the control information to indicate that the retransmission is for the traffic in the point-to-multipoint initial transmission.

12. The second device of claim 11, wherein the at least one memory and the computer program code are configured to, with the at least one processor, cause the second device to determine the at least one field of the control information by:

determining the format of the control information and the search space such that the determined format is a format configured for the determined search space.

13. The second device of claim 11, wherein the at least one memory and the computer program code are configured to, with the at least one processor, cause the second device to determine the at least one field of the control information by:

setting a first field for an identifier for the format of the control information to a first predefined value, setting a second field for a transmit power control command to a second predefined value, setting a size of information contained in a third field for frequency domain resource allocation based on a size of a common frequency resource, setting a fourth field for a carrier indicator to a third predefined value, and setting that a fifth field for a bandwidth part indicator to a fourth predefined value.

14. The second device of claim 13, wherein the at least one memory and the computer program code are configured to, with the at least one processor, cause the second device to determine the at least one field of the control information by:

in accordance with a determination that the search space is a user equipment-specific search space or a common search space, and the format of the control information is downlink control information format 1_0, setting the first field to the first predefined value, and setting the second field to the second predefined value.

15. The second device of claim 13, wherein the at least one memory and the computer program code are configured to, with the at least one processor, cause the second device to determine the at least one field of the control information by:

in accordance with a determination that the search space is a common search space and the format of the control information is downlink control information format 1_1 or downlink control information format 1_2, setting the size of information contained in the third field based on the size of the common frequency resource.

16. A method comprising:

receiving, at a first device, control information from a second device;

in accordance with a determination that the control information indicates a retransmission to be scheduled from the second device, determining an information combination of at least one the following: at least one field of the control information, a search space in which the control information is received, and a format of the control information; and determining a source traffic type of the retransmission based on the information combination, the source traffic type of the retransmission indicating whether the retransmission is for traffic in a point-to-multipoint initial transmission or in a point-to-point initial transmission.

17. The method of claim 16, wherein determining the source traffic type of the retransmission comprises:

in accordance with a determination that the format of the control information is a format not configured for the search space, determining that the source traffic type of the retransmission indicates that the retransmission is for the traffic in the point-to-multipoint initial transmission.

18. The method of claim 17, wherein determining that the source traffic type of the retransmission indicates that the retransmission is for the traffic in the point-to-multipoint initial transmission comprises:

in accordance with a determination that the search space is a common search space, and a determination that the format of the control information is downlink control information format 1_1 or downlink control information format 1_2, determining that the source traffic type of the retransmission indicates that the retransmission is for the traffic in the point-to-multipoint initial transmission.

* * * * *